US00RE35513E

United States Patent [19]

Nobel et al.

[11] E Patent Number: Re. 35,513

[45] Reissued Date of Patent: May 20, 1997

[54] CYANIDE-FREE PLATING SOLUTIONS FOR MONOVALENT METALS

[75] Inventors: Fred I. Nobel, Sands Point; William R. Brasch, Nesconset; Anthony J. Drago, East Islip, all of N.Y.

[73] Assignee: Learonal, Inc., Freeport, N.Y.

[21] Appl. No.: 633,271

[22] Filed: Apr. 10, 1996

Related U.S. Patent Documents

Reissue of:

[64] Patent No.: 5,302,278
Issued: Apr. 12, 1994
Appl. No.: 19,949
Filed: Feb. 19, 1993

[51] Int. Cl.[6] ..... C25D 3/38

[52] U.S. Cl. ..... 205/263; 205/267; 205/296; 205/239; 205/242; 205/247; 106/1.23

[58] Field of Search ..... 205/263, 267, 205/296, 238, 239, 247, 242; 106/1.23

[56] References Cited

U.S. PATENT DOCUMENTS

| | | | |
|---|---|---|---|
| 1,969,553 | 8/1934 | Gernes | 204/10 |
| 3,984,292 | 10/1976 | Culjkovi | 204/46 R |
| 4,067,784 | 1/1978 | Leahy et al. | 204/46 R |
| 4,540,473 | 9/1985 | Bindra et al. | 205/291 |

OTHER PUBLICATIONS

F. I. Kukov et al., "Thiosulfate Silver Plating Electrolyte", Inter–Republican Sci. and Techn. Conf., Volgograd Engng. Inst. Volgograd (1990), pp. 51–53. No month available.

C. Barnes, "A Non–Cyanide Copper Plating Solution Based on a Cuprous Salt", Institute of Metal Finishing Annual Technical Conference, Harrogate, May 5–9, 1981, pp. 201–210.

D. C. Gernes et al., "Single Metal Deposition of Copper, Cadmium, Zinc and Nickel from Thiosulfate Solutions", Seventy–Seventh General Meeting, Apr. 26, 1940, pp. 177–207.

*Primary Examiner*—Kathryn L. Gorgos
*Assistant Examiner*—Kishor Mayekar
*Attorney, Agent, or Firm*—Pennie & Edmonds

[57] ABSTRACT

A solution for use in electroplating which comprises at least one monovalent metal such as copper, silver or gold which is complexed by a thiosulfate ion; and a stabilizer of an organic sulfinate compound such as, for example, one having the formula $R\text{-}SO_2\text{-}X$ wherein R is an alkyl, heterocyclic or aryl moiety and X is a monovalent cation. The stabilizer is present in an amount sufficient to stabilize the thiosulfate ion when the solution is operated at an acidic pH of less than 7. Also, the solution is substantially free of cyanide.

35 Claims, No Drawings

CYANIDE-FREE PLATING SOLUTIONS FOR MONOVALENT METALS

Matter enclosed in heavy brackets [ ] appears in the original patent but forms no part of this reissue specification; matter printed in italics indicates the additions made by reissue.

BACKGROUND OF THE INVENTION

1. Technical Field

The present invention relates to a cyanide-free electroplating solution for depositing monovalent copper, silver, gold and other metals.

2. Background Art

Copper plating has been successfully accomplished for many years from cyanide-based plating solutions. In these solutions, copper is present as the monovalent copper cyanide complex. The solution may also contain free or uncomplexed alkali cyanide, alkali hydroxide and complexing agents such as alkali-tartrate to help dissolve copper anodes. Although these solutions have been successful, the industry has constantly been in search of substitute for the poisonous cyanide ions.

Acidic divalent copper solutions have been commercially successful and are free of cyanide; however, these divalent solutions require twice as much total current to deposit the same amount of copper as do monovalent copper solutions. Furthermore, the acidic solutions cannot achieve the proper adhesion of copper when plating directly onto steel.

Alkaline divalent copper solutions have achieved limited commercial acceptance. These solutions are free of cyanide and are capable of plating directly onto steel with good adhesion. Since copper is divalent, however, the plating rate for a given amount of current is the same as that obtained from acidic divalent copper solutions.

To date, there are no commercially successful monovalent copper plating baths that are free of cyanide, stable, and capable of plating directly onto steel with good adhesion.

Cuprous halides with excess alkali halides have been proposed in the form of chlorides or iodides. Neither of these have reached commercial acceptance.

U.S. Pat. No. 1,969,553 describes a process for plating monovalent copper based on a solution containing sodium thiosulfate and cuprous chloride. This process was studied further and reported at the 77th general meeting of the Electrochemical Society, Apr. 26, 1940. A more recent study of the cuprous thiosulfate bath was reported in May 1981 at the annual technical conference of the Institute for Metal Finishing at Herrogate, U.K. These baths plated copper from monovalent solutions in which copper was complexed with a thiosulfate ion. It was reported that the stability of the bath was further improved with the addition of a sulfite ion. The pH of the solutions was in the range of 6 to 11, with the optimum range being 8.5 to 9.5. Acidic solutions having a pH of 6 or less were reported to be unstable and sulfur dioxide, resulting from the acidified sulfite ion, continuously evolved from these solutions. The authors concluded that these plating baths offered no significant improvement over an alkaline cupric pyrophosphate bath, and no further work has been reported to date involving thiosulfate-based monovalent copper plating baths.

Silver has been deposited commercially from cyanide baths for any years with good success. These silver solutions contain silver complexed with the cyanide ion, additives to improve the deposit or the plating bath, and may contain free alkali cyanide. The industry has also shown a strong interest in cyanide-free silver plating baths because of the toxic nature of the cyanide ion.

U.S. Pat. No. 4,126,524 discloses a cyanide-free silver plating bath in which silver is complexed with imides of organic dicarboxylic acids. This process has achieved some commercial success, however, the organic compounds are expensive and some instability has been reported.

Cyanide-free silver baths have also been reported based upon silver sulfite and silver thiocyanate complexes. However, these solutions have not achieved commercial success at this time.

Silver has been deposited from cyanide-free solutions based upon the thiosulfate ion. Such baths are disclosed in U.S. Pat. Nos. 3,984,292 and 4,067,784. Also, F. I. Kukov et al. (R. Zh. Korr. i Zasch. of Korr. 12K460, 1990) discloses a silver plating bath based upon thiosulfate, sulfite, and thiocyanate at a pH of 4 to 6. None of these solutions, however, have achieved commercial acceptance at this time.

Gold plating baths are also preferably cyanide-free and such baths have been disclosed based upon sulfite, thiocyanate, and thiosulfate complexes. These gold baths are mainly alkaline and have achieved some limited success in spite of the fact that they are not as stable as gold baths based upon the cyanide ion.

SUMMARY OF THE INVENTION

The invention relates to cyanide-free electroplating baths of monovalent gold, silver, copper or one of their alloys based upon stable solutions of metal thiosulfates operating at acidic [Phs] *pHs* that overcome the deficiencies of the prior art baths noted above.

Thus, the invention is directed to a solution for use in electroplating which comprises at least one monovalent metal which is complexed by a thiosulfate ion; and a stabilizer of an organic sulfinate compound. Suitable compounds include those having the formula $R\text{-}SO_2\text{-}X$ wherein R is an alkyl or aryl moiety and X is a monovalent cation. The stabilizer is present in an amount sufficient to stabilize the thiosulfate ion when the solution is operated at an acidic [Ph] *pH* of less than 7.

The metal is typically copper, silver, gold, or combinations thereof and is present in an amount of between about 0.5 to 100 g/l. Alloying elements of palladium, nickel, zinc or other metals can also be used if desired. These alloying elements may be complexed by the thiosulfate ion or by other solution-compatible complexing agents. Also, the thiosulfate ion and monovalent metal ion or ions are preferably present in a molar ratio of about 1:1 to 3:1, with the thiosulfate ion being present in an amount in excess of that necessary to complex the metal.

The stabilizer preferably has R as an alkyl group having one to eighteen carbon atoms in a linear or branched configuration; or an aromatic or heterocyclic group having between five and fourteen carbon atoms in a configuration of one, two or three rings, wherein each ring is optionally substituted by an alky group having one to six carbon atoms, and further wherein R is optionally substituted with a water solubilizing group, such as a sulfate, sulfonate, hydroxy group, carboxyl group, halide or the like. Also, X may be hydrogen, an alkali metal ion, or an ammonium ion. The most preferred stabilizers are benzene, toluene, xylene, naphthalene or bisphenol A sulfinic acid or an alkali or ammonium salt thereof. The stabilizer is present in an amount of at least about 2 g/l, and preferably about 5 to 15 g/l.

The solution may further include at least one additive to improve or enhance the performance of the solution during electroplating. This additive may be an electroplating current density range extender, a surfactant or a brightener. Preferred additives include amines or alkylene oxide condensation compounds of an organic compound, or their solution soluble derivatives.

The solution has a pH above about 3.5 and below 7, and may include an acid in an amount sufficient to maintain the pH between about 4 and about 6. The temperature is maintained within the range of about 55° to 120° F., and the solution is substantially free of cyanide.

DETAILED DESCRIPTION OF THE INVENTION

Metal plating baths are disclosed based upon one or more monovalent metals which are complexed by the thiosulfate ion, preferably in a solution containing an excess of thiosulfate ions, which solution is operated at a mildly acidic pH range preferably in the range of about 4 to 6 and is stabilized with an organic sulfinate compound.

While any organic sulfinate compound should be useful as a stabilizer, examples of suitable compounds include those having the formula $R\text{-}SO_2\text{-}X$, where R equals an organic moiety such as an alkyl group having between one and eighteen carbon atoms in a linear or branched configuration, or an aromatic or heterocyclic group having between five and fourteen carbon atoms in one, two or three rings, wherein each ring is optionally substituted with an alkyl group having one to six carbon atoms. The organic compound may also include substituents such as hydroxyl groups, carboxyl groups, halides or other substituents such as sulfates, sulfonates, phosphates, phosphonates, carboxylates, etc. which increase the solubility of the compound in the electroplating solution. The most preferred organic compounds are those in which R is an aromatic ring, optionally substituted with an alkyl group having between one and three carbon atoms, and X is hydrogen, an alkali metal ion, such as sodium or potassium, or an ammonium ion. Specific examples for the R moiety include benzene, toluene, xylene, naphthalene or bisphenol A, while sodium is the preferred X substituent.

It is believed that the sulfinic radical ($SO_2$) is the reason why solutions containing this stabilizer are stable over time and under various operating conditions. Furthermore, the stability of these thiosulfate baths allows their operation under acid conditions to produce the most desirable deposit characteristics and plating range for commercial use.

Prior art thiosulfate baths were stabilized with sulfite ions, but were shown to be unstable when operated at a pH of 6 or below, since sulfur dioxide was liberated from the bath under these pH conditions. It is known that the thiosulfate ion decomposes in acid solution to give elemental sulfur and sulfite ions. This is a reversible equilibrium according to the following equation:

$$S_2O_3^- + H^+ \rightleftharpoons S^\circ + HSO_3^-$$

When an aqueous solution of sodium thiosulfate is adjusted to a pH of about 4 to 5, the solution will turn cloudy due to the formation of elemental sulfur. However, if sodium sulfite is also added to the above solution, elemental sulfur will not form and the solution will be stable and clear. Sodium sulfite has, therefore, been used in prior art plating solutions of metal and sodium thiosulfate to stabilize the solution. The problem with using sodium sulfite, however, is that the sulfite ion itself is not stable in mildly acidic solutions, such that sulfur dioxide is slowly formed and liberated from the solution. The more acidic the solution, the faster the rate of sulfur dioxide formation will be. This leads to high consumption of sodium sulfite and instability of the metal thiosulfate complex in acidic solutions.

Surprisingly, it has been found that the present organic sulfur compounds have the same stabilizing effect on thiosulfates as do sulfites without the accompanying breakdown and liberation of sulfur dioxide. While any one of the compounds falling within the above-identified formula should be useful, the most preferred of these compounds is the sodium salt of benzene sulfinic acid. This material stabilizes the thiosulfate ion in mildly acidic solutions, such that the solution does not break down on standing or under electrolysis, and does not liberate any appreciable amounts of sulfur dioxide.

The amount of organic sulfinate compound or organic trivalent sulfur compound required is not critical and depends on concentrations of other solution ingredients and temperature. The quantities of this stabilizer can vary from about 2 g/l up to saturation with about 5 to 15 g/l preferred.

The thiosulfate ion can be supplied in any solution soluble form, such as an alkali thiosulfate (i.e., sodium, potassium, or ammonium thiosulfate) with sodium thiosulfate pentahydrate being the most economical and readily available source. The quantity of thiosulfate required depends on the amount of metal to be complexed in solution. However, it is advantageous for the molar ratio of thiosulfate ion to metal ion in solution to be at least about 1:1 and preferably about 2:1 or greater. High ratios of 3:1 or more should be avoided, since the plating range may become narrowed.

Metal ions can be supplied to the plating bath in any form that will dissolve with thiosulfate ions, providing that the other ions produced by the metal compound used will not be environmentally or electrolytically harmful. Suitable metal compounds are chlorides, phosphates, carbonates, oxides, hydroxides, or chelates. The metal chloride compounds are preferred and found to be most desirable for stability of the metal thiosulfate complex under acid conditions. The monovalent metals which may be used in the solutions of the invention include gold, silver or copper in the monovalent state, alloys of these elements, or additional metals which are capable of forming a thiosulfate complex at a mildly acidic pH, such as palladium, nickel and zinc. The quantity of metal used in the plating bath will depend upon the plating range desired and can vary from about 0.5 to 100 g/l. For barrel plating installations where the current density range is low, the metal content can be as low as 5 g/l, and about 25 g/l or more can be used where higher current densities are required. For high speed electroplating, metal concentrations can be as high as 50 to 100 g/l or more, as required, can be used.

The pH of the solution is adjusted with a suitable acid such as phosphoric sulfuric, hydrochloric, or citric. Phosphoric acid or its acid salts are preferred because of their ability to also act ass a buffer. A useful pH range is from about 3.5 to 7 with about 4 to 6 being preferred. If the pH is below about 3.5, the solution becomes unstable and cloudy, while at a pH of about 6.5 or greater, the high current density range and quality of deposit are adversely affected.

The operating temperature is ambient and can vary from about 55° to 120° F. Higher operating temperatures of 120° to 140° F. or more are not desirable since the consumption of the sulfinate compound would probably increase, and the adhesion of the resultant deposit to steel substrates would be reduced.

Furthermore, it has been determined that during electrolysis using acid thiosulfate copper based baths, certain amine compounds have a beneficial effect in extending the plating range and improving the anode efficiency. The compounds preferred are the alkanolamines, and the most preferred is triethanolamine. The quantity of amine to be used for this purpose is not critical and can vary from zero to saturation. A typical range is between about 10 and 30 g/l.

Alkaline oxide condensates of suitable organic compounds can be included in the solution of improve the characteristics of the deposits. Examples are ethoxylated phenols, ethoxylated styrenated phenols, ethoxylated bisphenol A, block polymers of aliphatic alcohols, or their sulfonate or sulfate derivatives. The quantity of such compounds can vary from zero to 20 g/l, with a typical range being about 1 to 5 g/l. These compounds act as surfactants or as brighteners depending upon the specific compound used and its concentration in the electroplating solution.

EXAMPLES

The following examples illustrate the preferred embodiments of the invention:

EXAMPLE 1

A monovalent copper plating bath was prepared by dissolving the following compounds in deionized water.

| | |
|---|---|
| Sodium Thiosulfate Pentahydrate | 188 g/l |
| Triethanolamine | 20 ml/l |
| Benzene Sulfinic Acid Sodium Salt Dihydrate | 10 g/l |
| Cuprous Chloride | 35 g/l |
| Surface Active Agent | 2 g/l |

The pH of the bath was adjusted to 5 by the addition of phosphoric acid.

Brass and steel panels were electroplated in the above bath at cathode current densities of 5 and 10 amperes per square foot (0.5–1.08 ASD). The temperature of the bath during plating was at ambient (70°–75° F., 21°–24° C.) and the bath was agitated by a motorized stirrer. The time of plating was 36 minutes to obtain a deposit thickness of 0.3 mil (7.5 micron) at 5 ASF (0.54 ASD). The deposit was smooth, semi-bright in appearance and suitably adherent to the base metals tested.

To test the stability of the bath, it was left idle for more than 2 months. A visual observation at the end of that time showed that the bath was clear straw yellow in color, just as it was at the beginning of the test.

EXAMPLE 2

A monovalent silver plating bath was prepared by dissolving the following compounds in deionized water.

| | |
|---|---|
| Ammonium Thiosulfate liquid (60%) | 150 ml/l |
| Benzene Sulfinic Acid Sodium Salt Dihydrate | 10 g/l |
| Triethanolamine | 10 ml/l |
| Silver Chloride | 40 g/l |

The pH of the bath was adjusted to 5 with a sufficient amount of dilute hydrochloric acid solution.

Brass panels were prepared, then electroplated in the silver bath described, at 10 ampere per square foot (1.08 ASD) cathode current density for 7.5 minutes. The temperature was ambient (70°–75° F., 21°–24° C.) and the solution was agitated with a motorized stirrer. The resulting deposit was smooth, matte white in appearance over the entire surface of the panels.

EXAMPLE 3

A monovalent silver plating bath for high speed plating applications was prepared by dissolving the following compounds in deionized water.

| | |
|---|---|
| Ammonium Thiosulfate liquid (60%) | 300 ml/l |
| Benzene Sulfinic Sodium Salt Acid Dihydrate | 10 g/l |
| Silver Chloride | 80 g/l |

The pH of the bath adjusted to 5 with a sufficient amount of dilute hydrochloric acid solution.

Copper wire 0.05 inches in diameter was prepared, then electroplated in the silver bath at 50 ampere per square foot (5.4 ASD) for 1.5 minutes at 70°–75° F. (21°–24° C.) with vigorous solution agitation. The resulting deposit was smooth matte white in appearance.

EXAMPLE 4

A monovalent gold plating bath was prepared by dissolving the following compounds in deionized water.

| | |
|---|---|
| Sodium Thiosulfate Pentahydrate | 200 g/l |
| Benzene Sulfinic Acid Sodium Salt Dihydrate | 10 g/l |
| Hydrogen Tetrachloroaurate | 13 g/l |
| Nickel Chloride Hexahydrate | 0.5 g/l |

The pH of the bath was adjusted to 4.8 by the addition of a sufficient amount of phosphoric acid.

Polished brass coupons which were cleaned and activated were then electroplated in the gold bath at 2 ampere per square foot (0.216 ASD) for 5 minutes. The temperature of the bath during plating was at 70°–75° F. (21°–24° C.). The bath was agitated with a motorized stirrer. The resultant deposit was mirror bright, pale yellow in color.

EXAMPLE 5

A plating bath was prepared as described above in Example 1, except the benzene sulfinic acid compound was omitted from the formula.

After just remaining idle 2 days, the bath was found to be dark brown in color and excessive precipitation was observed.

EXAMPLE 6

A plating bath was prepared as described above in Example 1 except sodium sulfite was substituted for the benzene sulfinic acid compound in the formula.

After remaining idle 10 days, the bath was dark brown in color with excessive precipitation, similar to that of the bath of Example 5.

EXAMPLE 7

To further illustrate the invention, two 20 ml samples of baths were placed in 100 ml beakers and set on a heated hot plate. One sample contained the bath of Example 1 and the other contained the Example 5 bath (i.e., the Example 1 bath without the benzene sulfinic acid compound). After a few minutes of heating, the sample without the benzene sulfinic acid became unstable, turning dark brown in color. The sample with the benzene sulfinic acid remained clear straw yellow in color and continued to remain clear straw yellow in color at the boiling temperature for the same time period.

EXAMPLE 8

A monovalent copper plating bath was prepared by dissolving the following compounds in deionized water.

| | |
|---|---|
| Ammonium Thiosulfate Liquid (60%) | 313 g/l |
| Triethanolamine | 20 ml/l |
| Cuprous Chloride | 35 g/l |
| Sulfinic Acid Sodium Salt Dihydrate | 10 g/l |
| Surface Active Agent | 1.5 g/l |
| Phospheric Acid to adjust pH to | 5.2 |

Brass hull cell panels were run at room temperature for five minutes at a total current of 0.5 amperes. The deposit was smooth, semi-bright from the low current density edge up to 20 ASF.

EXAMPLE 9

To the solution of Example 8, 1 g/l of zinc metal as zinc chloride was added and a hull cell panel was run at the same conditions as in Example 8. The resultant electrodeposit was smooth and semi-bright within the plating range of up to 40 ASF.

EXAMPLE 10

A monovalent copper bath was prepared as described above in Example 1, except the sodium salt of para toluene sulfinic acid was substituted for the sodium benzene sulfinic acid in the formula.

Brass and steel panels were electroplated as in Example 1. The deposit appearance, adhesion, and bath stability were substantially equivalent to those of Example 1.

EXAMPLE 11

A monovalent copper bath was prepared as in Example 1, except the sodium salt of naphthalene 1-sulfinic acid was substituted for the sodium benzene sulfinic acid in the solution. Substantially equivalent deposit appearance, adhesion, and bath stability was observed compared to those of Example 1.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

What is claimed is:

1. A solution for use in electroplating which comprises:

at least one monovalent metal which is complexed by an amount of a thiosulfate ion; and a stabilizer of an organic sulfinate compound in an amount sufficient to stabilize the thiosulfate ion when the solution is operated at an acidic pH of less than 7.

2. The solution of claim 1 wherein the monovalent metal is copper, silver, gold or combinations thereof.

3. The solution of claim 1 wherein the metal is present in an amount of between about 0.5 to 100 g/l.

4. The solution of claim 1 wherein the thiosulfate ion and metal ion or ions are present in a molar ratio of about 1:1 to 3:1.

5. The solution of claim 1 wherein the thiosulfate ion is present in excess of the amount necessary to complex the metal.

6. The solution of claim 1 further comprising an alloying element for deposition with the monovalent metal.

7. The solution of claim 6 wherein the alloying element is palladium, nickel or zinc.

8. The solution of claim 7 wherein the alloying element is complexed with a complexing agent other than a thiosulfate.

9. The solution of claim 1 wherein the stabilizer has the formula $R\text{-}SO_2\text{-}X$ wherein R is an alkyl, heterocyclic or aryl moiety and X is a monovalent cation.

10. The solution of claim 9 wherein R is an alkyl group having one to eighteen carbon atoms in a linear or branched configuration; or an aromatic or heterocyclic group having between five and fourteen carbon atoms in a configuration of one, two or three rings, wherein each ring is optionally substituted by an alkyl group having one to six carbon atoms.

11. The solution of claim 9 wherein X is hydrogen, an alkali metal ion, or an ammonium ion.

12. The solution of claim 9 [Wherein] *wherein* R is substituted with a water solubilizing group.

13. The solution of claim 12 wherein the water solubilizing group is a hydroxy group, a carboxyl group, a halide, a sulfate, a sulfonate, a phosphate, a phosphonate or a carboxylate.

14. The solution of claim 1 wherein the stabilizer is benzene, toluene, zylene, naphthalene or bisphenol A sulfinic acid or an alkali or ammonium salt thereof.

15. The solution of claim 1 wherein the stabilizer is present in an amount of at least about 2 to 15 g/l.

16. The solution of claim 15 wherein the stabilizer is present in an amount of about 5 to 15 g/l.

17. The solution of claim 1 further comprising at least one additive to improve or enhance the performance of the solution during electroplating.

18. The solution of claim 17 wherein the additive is an electroplating current density range extender, a surfactant or a brightener.

19. The solution of claim 17 wherein the additive is an amine, an alkylene oxide condensation compound of an organic compound, or a solution soluble derivative thereof.

20. The solution of claim 17 wherein the additive is triethanolamine and is present in an amount of about 10 to 30 g/l.

21. The solution of claim 1 having a pH above about 3.5 and below 7.

22. The solution of claim 21 which further comprises an acid in an amount sufficient to maintain the pH between about 4 and about 6.

23. The solution of claim 1 wherein the temperature of the solution is maintained within about 55° to 120° F. and the solution is substantially free of cyanide.

24. A solution for use in electroplating which comprises: at least one monovalent metal of copper, silver, gold or combinations thereof in an amount of between about 0.5 to 100 g/l which is complexed by a thiosulfate ion and wherein the thiosulfate ion and metal ion or ions are present in a molar ratio of about 1:1 to 3:1; and a stabilizer of an organic sulfinate compound in an amount of at least about 2 to 15 g/l to stabilize the thiosulfate ion when the solution is operated at an acidic pH of between about 4 and 6.

25. The solution of claim 24 further comprising an alloying element for deposition with the monovalent metal and wherein the organic sulfinate compound includes a water solubilizing group.

26. The solution of claim 25 further comprising at least one additive to improve or enhance the performance of the solution during electroplating, and wherein the temperature of the solution is maintained within about 55° to 120° F., and the solution is substantially free of cyanide.

27. The solution of claim 26 wherein the stabilizer has the formula R-$SO_2$-X wherein R is an alkyl, heterocyclic or aryl moiety, X is a monovalent cation and the alloying element is complexed with a complexing agent other than a thiosulfate.

28. The solution of claim 27 wherein the thiosulfate ion is present in an amount in excess of that necessary to complex the metal and the solubilizing group is a hydroxy group, a carboxyl group, a halide, a sulfate, a sulfonate, a phosphate, a phosphonate or a carboxylate.

*29. A metal plating bath which comprises: a solution of at least one monovalent metal ion which forms a thiosulfate complex; a solution soluble thiosulfate ion in an amount sufficient to form a complex with the metal ion or ions; and an organic sulfinate ion in an amount sufficient to stabilize the thiosulfate ion in the solution.*

*30. The bath of claim 29 wherein the monovalent metal is copper, silver, gold or combinations thereof and is present in the solution in an amount of up to about 100 g/l.*

*31. The bath of claim 29 wherein the thiosulfate ion and metal ion or ions are present in a molar ratio of greater than 1:1.*

*32. The bath of claim 29 wherein the sulfinate ion is provided by a compound having the formula R-$SO_2$-X where R is an alkyl, heterocyclic or aryl moiety and X is a monovalent cation.*

*33. The bath of claim 32 wherein R is an alkyl group having one to eighteen carbon atoms in a linear or branched configuration; or an aromatic or heterocyclic group having between five and fourteen carbon atoms in a configuration of one, two or three rings, where each ring is optionally substituted by an alkyl group having one to six carbon atoms, R is optionally substituted with a water solubilizing group, and X is hydrogen, an alkali metal ion or an ammonium ion, said sulfinate compound being present in an amount of at least 2 g/l.*

*34. The bath of claim 29 further comprising an alloying element for deposition with the monovalent metal, where the alloying element is complexed with a complexing agent.*

*35. The bath of claim 29 further comprising at least one additive to improve or enhance the performance of the solution during plating, wherein the temperature of the solution is maintained at about 55° F. to about 120° F. and the solution is substantially free of cyanide.*

* * * * *